United States Patent Office 3,018,600
Patented Jan. 30, 1962

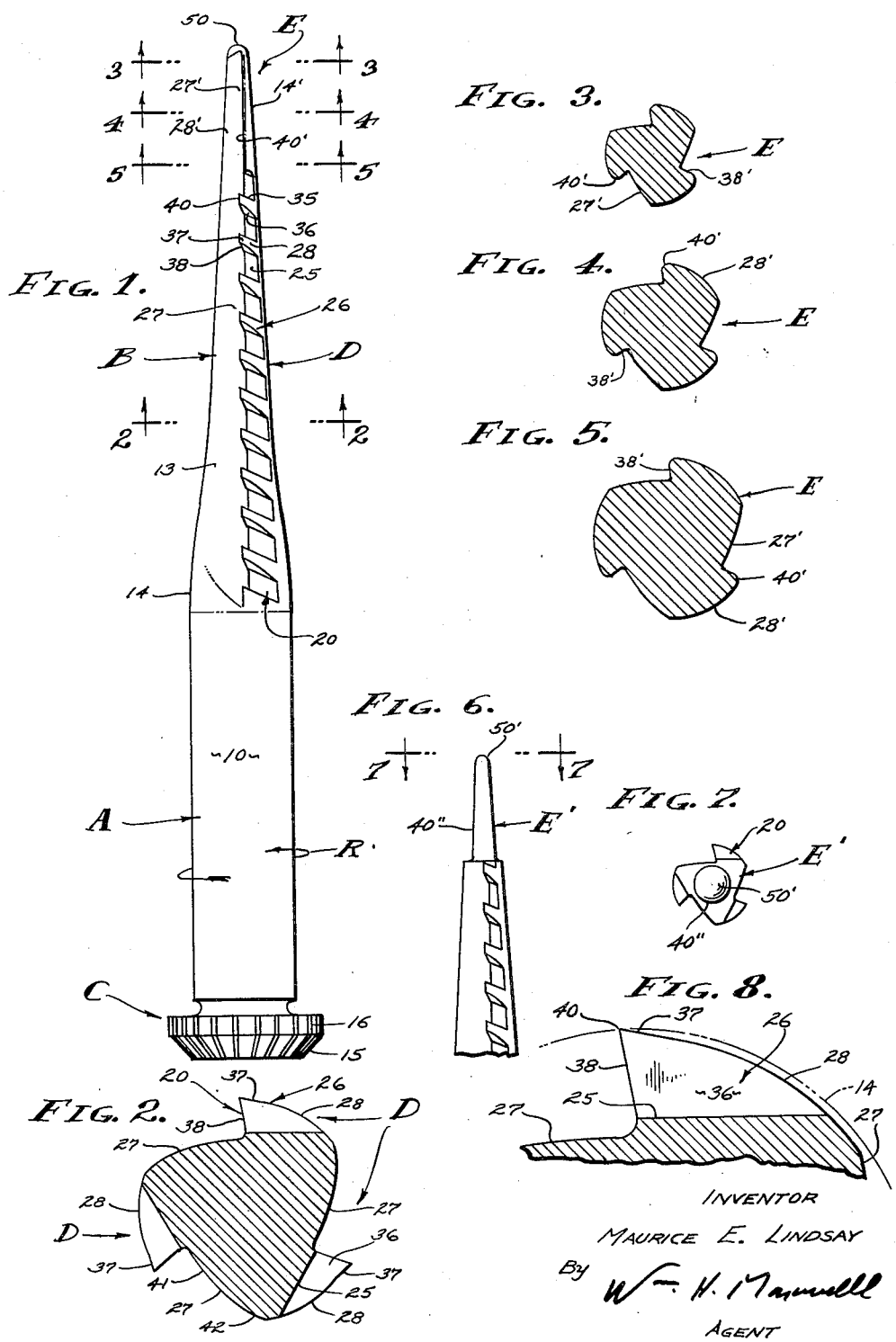

3,018,600
SHUTTLE-POINT COTTON PICKING SPINDLE
Maurice E. Lindsay, Bakersfield, Calif., assignor, by mesne assignments, to Spindle Specialty Co., Bakersfield, Calif., a corporation of California
Filed Sept. 19, 1958, Ser. No. 762,033
10 Claims. (Cl. 56—50)

This invention relates to a new and improved cotton picking spindle and particularly relates to a spindle for use in cotton picking machines for the harvesting of crops of cotton and wherein the picking action is delayed so that unripened cotton is not picked, it being a general object of this invention to provide a spindle that delays picking action in a manner to improve the yield and to improve the quality of the cotton being picked.

This invention is an improvement over the Cotton Picking Spindle taught and claimed in my United States Patent No. 2,823,509, issued February 18, 1958.

Cotton picking machines employ a multiplicity of picking units, each unit being composed of various elements including the spindles and doffers, or doffing wheels. The ordinary machine has circumferentially spaced series of cotton picking spindles that are rotated and are advanced progressively into the crop of cotton to be harvested. As the spindles are operated, they draw the cotton fibers from the pods, which fibers are wound onto the spindles. The doffers, which operate at a greater speed than the spindles then unwind the cotton fibers from the spindles so that the spindles are cleaned. The objective is to collect as much cotton fibers as possible; however, it is recognized that unripened cotton should not be picked. That is, cotton bolls that have not completely burst should be left undisturbed, and saved for a subsequent picking operation and harvesting thereof.

The type of cotton picking spindle under consideration is the Hagen spindle as disclosed in United States Patent No. 2,546,185. This type of spindle is manufactured, generally, by milling a row of barbs leaving facets therebetween, and by then milling ahead of the barbs forming the front faces of the barbs and forming a lead face in front of the barbs. The machining, or milling, operations are carried on to the extreme tip of the spindle with the result that the spindle tip is interrupted by flat side faces. As in most cases, when there are three rows of barbs the tip of the spindle is triangular in cross-sectional configuration, and is other than round or smooth. Said polygonal, or unsmooth, configuration with which the present invention is concerned occurs only at the tip of the spindle and is, in the Hagen spindle, of a longitudinal extent equal to about the longitudinal width of one barb.

My Patent No. 2,823,507 teaches the concept of delayed picking action as a result of a substantially elongate tip portion devoid of barbs and having a smooth exterior. It was found that with this formation only ripened cotton was picked due to the fact that unripened cotton bolls which had not burst sufficiently would not be engaged by the spindle barbs. In other words, the smooth spindle tip will hold the unripened bolls away from the active barbs so that they are not engaged thereby. Further, less roping or twisting was experienced and, therefore, a better grade of cotton was produced.

Due to the methods of manufacturing the type of spindle under consideration, as above pointed out in connection with the Hagen spindle, a sharp corner is left remaining at the periphery of the tip portion of the spindle as a result of the machining of the recess, or lead face, ahead of the barbs. The sharp corner referred to is equivalent to the barb points and is in a line coincidental with said points. Although said sharp corner does not detract from the effectiveness of a barbless tip portion with a smooth exterior, it does have an adverse effect in that it has a cutting or picking action to a noticeable degree and this cutting action results in damage to green cotton bolls by cutting and bruising them and sometimes entering green bolls.

An object of this invention is to provide a spindle for cotton pickers wherein the tip portion is formed to have virtually no picking action. With the spindle as herein disclosed any tendency for the tip portion to pick is minimized by the complete elimination of all sharp corners.

It is another object of this invention to provide a spindle that reduces injury to unripened cotton bolls to a minimum by the elimination of all sharp corners from the tip portion of the spindle and to the end that said tip portion cannot engage the cotton fiber that may be issuing only slightly from a partially burst or unripened cotton boll.

It is still another object of this invention to provide a cotton picking spindle that has increased picking action coupled with increased doffing efficiency. The spindle that I now provide has a doffing face of reduced diameter without reduction in barb height, and this doffing face, or portion of the lead face merges with the lead face that curves forwardly and inwardly from the next succeeding row of barbs.

The various objects and features of my invention will be fully understood from the following detailed description of the typical preferred forms and applications of my invention, throughout which description reference is made to the accompanying drawings, in which:

FIG. 1 of the drawings illustrates a cotton picking spindle embodying the "shuttle-point" that prevents picking action at the tip portion thereof. FIG. 2 is an enlarged sectional view of a typical portion of the spindle and taken as indicated by line 2—2 on FIG. 1. FIGS. 3, 4 and 5 are enlarged sectional views taken at the tip portion of the spindle as indicated by lines 3—3, 4—4 and 5—5, on FIG. 1, respectively. FIGS. 6 and 7 illustrate a second form of the invention, FIG. 6 being a view similar to a portion of FIG. 1 and FIG. 7 being an end view taken as indicated by line 7—7 on FIG. 6, and FIG. 8 is an enlarged detailed sectional view of a portion of the spindle as shown in FIG. 2.

The present invention is concerned both with the tip portion of a cotton picking spindle and with the cross sectional formation thereof which determines the picking and doffing characteristics of the spindle. Therefore, the tip portion of the spindle is in the nature of a projection and functions to hold any solid material, such as the pod of an unripened cotton boll, away from the rows of active barbs, while the cross section of the spindle has lead face portions of reduced diameter. As illustrated, the spindle that I have provided is made of a single integral body of material and involves, generally, a bearing portion A, a cotton handling portion B, a drive means C, one or more picking means D, and a projecting tip portion E. The spindle is an elongate element generally round in cross-sectional configuration with the portion B preferably tapering toward one end or tip portion E thereof, and the means C is located at the opposite end thereof.

The bearing portion A is a straight elongate cylindrical part adapted to be rotatably carried in a sleeve or bushing (not shown) and has a smooth uninterrupted outer wall 10 turned concentric with the central longitudinal axis of the spindle.

The cotton handling portion B is preferably a tapered part or body 13 corresponding in diameter with the portion A at its base end 11 and converging to the tip portion E of the spindle. The portion B is integral with the bearing portion A and projects from the portion A on an axis coincidental therewith. The portion B is formed from a body 13 that is round in cross-section throughout its length and that is initially formed with a smooth outer wall 14 diminishing in diameter as it tapers toward the tip portion E of the spindle. In carrying out the invention, the greater part of the said wall 14 is removed, as best illustrated in FIG. 8, a portion of said wall remaining intact as shown in FIG. 1.

The drive means C is carried by the spindle at the end remote from the tip portion E and in accordance with the usual spindle construction, is in the form of a bevel drive gear 15. The gear 15 is formed in a flange 16 that projects radially from the end of the spindle remote from the tip portion E.

The general construction thus far described is made in accordance with ordinary practice and is formed of any suitable material such as steel and may be hardened or heat treated as circumstances require. However, the final finishing and/or heat treating of the part is preferably delayed until after the means D is formed therein as hereinafter described.

The picking means D is formed or cut into the body 13 of the cone B, and as indicated, is in the characteristic form of circumferentially spaced series 20 of barbs that extend longitudinally of the spindle. As shown, there is one or more series 20 of barbs, for example, there may be three or four such series, and as illustrated, there are three such series. Each series 20 of barbs is preferably alike and each is machined in the body 13, preferably by cutting or by grinding so that the remaining portions of the exterior or wall 14 of the portion B are undisturbed (see FIG. 1). Each series 20 involves, generally, a recessed face 25, a plurality of barbs 26 projecting from the face 25, a lead face 27 and a doffing face 28.

The recessed face 25 and barbs 26 are formed in the body 13 by suitable machining, preferably hobbing or grinding, and the face 25 is established by forming a plurality of facets cut to the same depth or in a common plane to occur between the barbs 26. Each recessed face 25 is preferably a flat face in a plane offset from the central longitudinal axis of the spindle and is angularly related to said axis. The face 25 is preferably spaced inwardly from the outer wall 14 of the cone B and is parallel with a plane coincidental with the outer wall of the cone. Since the cone B tapers toward the tip or point portion E of the spindle, the face 25 diminishes in width as it progresses toward the tip portion of the spindle.

The barbs 26 are in a straight elongate series 20, and as shown, are formed by cutting notches in the body 13, the bottom of each notch forming a facet of the face 25. As illustrated in the drawings, the barbs 26 are of like longitudinal sectional configuration and each involves an outer side wall 35 facing the tip portion E, an inner side wall 36 facing the base of the cone B, a top wall 37, and a front face 38 facing laterally in the general direction of rotation of the spindle as it operates.

The outer side wall 35 is in a substantially radial plane that is pitched outwardly and forwardly toward the tip portion E of the spindle. Thus, the wall 35 is at an acute angle with respect to the recessed face 25 and joins the face 25. The outer side wall 35 is flat and the walls 35 and the series of barbs 26 is preferably simultaneously formed by using a form cutter or gang cutter. The inner side wall 36 may be parallel with the wall 35 but is preferably pitched or angularly related thereto and slants inwardly toward the base 11 of the spindle from the top 37 of the barb to join the face 25. As shown, the side wall 36 is formed at about a 45° angle with respect to the recessed face 25 and provides what may be termed a sloping inner face that assists in releasing cotton fibers from the barbs 26.

The opposite side walls 35 and 36 of the barbs 26 are cut so that the barbs are directed or faced both laterally and longitudinally of the spindle. That is, the barbs are pitched or inclined to face in the direction of rotation indicated by arrow R and are inclined or pointed toward the tip portion E of the spindle. The top face 37 of each barb 26 is of reduced circumferential extent and is formed by removing a portion of the outer wall 14 of the cone B up to the barb point 40. The top face 37 is preferably flat and in a plane extending rearward and radially inward from the barb point, the barb point 40 being at the extreme periphery of the body 13, as shown.

The front face 38 of the spindle is substantially perpendicular to the face 25 and is preferably disposed in a plane extending longitudinally of the spindle which plane is preferably pitched inwardly from the wall 14 to the plane of the recessed face 25 and is preferably a hooked face in order to more aggressively draw cotton fibers from the pods. The front face 38 is pitched from a 5° to 35° angle while the top 37 is inclined and provides a point 40 of increased acute angle where the top wall 37 joins the front face 38, as clearly illustrated. With the barbs pointed as above described, with the inclined faces 37 and 38, both picking and doffing action provided by separate means or wheels is facilitated.

The lead face 27 that I have provided is formed so as to induce the movement of cotton fibers into engagement with the barbs 26 and is a curved face that extends from one row of barbs and curves forwardly to merge with the outer wall 14 of the cone B, or with the doffing face 28, later described. The inner portion 41 of the lead face 27 is substantially tangent to the plane of the face 25 while the forward portion 42 of the lead face 27 curves outwardly in the direction of rotation of the spindle and merges with the outer diameter of the cone B or with the face 28.

In accordance with the invention, a substantial portion of the wall 14 is eliminated throughout the length of the cone B by forming the doffing face 28 that extends between the lead face 27 and the top face 37 of the barb. The doffing face 28 is preferably of substantially constant radius as it extends forwardly in the direction of rotation between the forward curved portion 42 of the lead face 27 and the rear edge of the top face 37. As shown, the curved doffing face 28 is radially inward of the outer diameter of the cone B throughout the length thereof. The picking means D, as defined by the combined lead face 27, doffing face 28 and top face 37, can be of uniform configuration, as shown, throughout the length of the tapered cone B and it will be apparent that the curved face 27 does not merge tangentially with the outer face 14 but merges with the face 28 at or near the point where the face 25 runs out at the doffing face 28. A marked advantage in providing the doffing face per se is the de-burring that is accomplished thereby. That is the hobbing or milling of the barbs 26 results in burrs at the periphery of the spindle, and these burrs are removed upon the forming of the doffing face 28.

In accordance with the present invention the tip portion E is formed in order to employ the concept of delayed picking action and is an inactive element, in so far as cotton picking is concerned, that projects axially from the picking cone B. The said inactive tip portion E is distinguished from the active cone B by the absence of barbs or any other picking features. Due to the methods employed in the manufacture of barbs of the type under consideration, wherein the machining operations are carried on to the extreme tip of the spindle, the lead face 27 and doffing face 28 necessarily have continuations 27' and 28' thereof that are cut or formed in the tip portion E. As shown in the first form of the invention, the tip portion E is formed by the tip of the cone B with a theoretical outer wall 14' continuing from the wall 14 of the cone B, said tip terminating in a rounded nose 50 and forming smooth elongate exterior surfaces. The tip portion E is of a longitudinal extent equal to the longitudinal with of several or more barbs 26, for example, three or four barbs.

The elongate tip portion E is best illustrated in FIG. 1 of the drawings and in the first form of the invention is a cone-shaped continuation of the cone B. Therefore, the portion E has the lead face 27' and doffing face 28' formed therein by carrying out of the machining operations employed to form the lead face 27 and doffing face 28. With said usual machining, as above pointed out, the tip portion E has a face 38' equivalent to the front face 38 of the barbs. However, I have eliminated the resultant sharp corner that is ordinarily formed thereby at the periphery of the cone. In the case illustrated, I provide a rounded corner 40' that is coextensive with the longitudinal extent of the tip portion E and which follows one doffing face 28' and preceeds the next following doffing face 28' as the spindle rotates.

It is to be observed, as clearly set forth above, that the wall 14 is removed and eliminated by the doffing face 28—28'. By elimination of the wall 14 the diameter of the cone B is materially reduced ahead of each succeeding row of barbs thereby increasing to a maximum degree the lead time for entry of cotton fibers into engagement with the barbs. However, the doffing efficiency is not reduced since a doffing face 28 of constant radius and of substantial circumferential extent is maintained rearward of the shortened barb top 37. It is significant that the faces 27 and 28 are advantageously formed by means of cutting them in a uniform cross section through their lengths, and also the rounded corner 40' can be advantageously made of substantially uniform cross-section throughout its length.

In practice, I employ an abrasive wheel such as a brush or a form cutter, or the like, to shape the rounded corner 40' so that the said corner extends radially outwardly from the lead face 27' and then rearwardly away from the direction of rotation to merge with the doffing face 28. The rounded corner 40' can be formed on a true radius or substantially so, and so that it merges tangentially with the doffing face as shown in FIGS. 3, 4 and 5.

As the rounded corner 40' progresses toward the nose 50 the progressively smaller diameter of the tip portion E prevents the outer portion of the rounded corner 40' from merging perfectly tangent with the doffing face 28' when forming the corner with a form cutter. Although this imperfection is hardly noticeable in actual practice, it can be corrected by employing an abrasive brush wheel that simply rounds off the corner by means of abrasion. The degree of roundness can be suitably governed by the amount of abrasive action applied.

In FIGS. 6 and 7 of the drawings I have illustrated a second form of the present invention wherein the rounded corner, above referred to, is formed by means of one simple machining operation, rather than by a cutting operation at each series 20 of barbs. In this form of the invention there is an elongate tip portion E' having a continuously rounded wall 40'' that is coextensive with the tip portion and which terminates at a rounded nose 50'. The tip portion E' is formed by a simple turning operation so that the wall 40'' is round in cross-section thus eliminating all corners that characterize the tip portions of ordinary cotton picking spindles. The tip portion E' can be straight and cylindrical, or it can be tapered somewhat and cone shaped, as indicated.

With the spindle as herein disclosed, the tip portion E, or E', is rendered completely inactive by the cross-sectional formation thereof characterized by roundness, and wherein the exterior walls are smooth. In the case of the first form of the invention the tip portion E is of rugged and durable construction, employing the full diameter of the tip portion of the cone B, and the rounded corner 40' does not project in a manner to have a picking action. In the case of the second form of the invention, the tip portion E' is of lighter construction than the first form, involving a simple turning operation for the shaping thereof, and the round wall 40'' does not project in a manner to have a picking action. Therefore, the tip portion, as herein disclosed is inactive and cannot operate to pick cotton, and therefore, acts only to space pods or unripened cotton bolls from the active cone B. In this way, only ripened and sufficiently burst cotton bolls are picked.

Having described only the typical preferred forms and applications of my invention, I do not wish to be limited or restricted to the specific details herein set forth, but wish to reserve to myself any variations or modifications that may appear to those skilled in the art and fall within the scope of the following claims:

Having described my invention, I claim:

1. A cotton picking spindle of the character described, including, an elongate body having a picking portion, picking means in the said portion and comprising a longitudinally extending series of circumferentially pointed barbs and said portion having a longitudinally extending recessed lead face extending ahead of the barbs to the periphery of the picking portion, and a substantially elongate cylindrical tip portion with a rounded exterior wall projecting longitudinally from and substantially tangent with the said lead face of the picking portion.

2. A cotton picking spindle of the character described, including, an elongate body having a picking portion, picking means in the said portion and comprising a longitudinally extending series of circumferentially pointed barbs and said portion having a longitudinally extending recessed lead face extending ahead of the barbs to the periphery of the picking portion, and a substantially elongate conical tip portion with a rounded exterior wall projecting longitudinally from and substantially tangent with the said lead face of the picking portion.

3. A cotton picking spindle of the character described, including, an elongate body having a picking portion, picking means in the said portion and comprising a longitudinally extending series of circumferentially pointed barbs and each with a front face in a substantially radial plane extending longitudinally of the body and to the periphery of the picking portion, and a substantially elongate tip portion forming a continuation of the picking portion and having a longitudinally extending front face forming a continuation of said first mentioned front faces, the tip portion when viewed in cross-section having a convex surface between said continuing front face and the outer periphery of said tip portion.

4. A cotton picking spindle of the character described, including, an elongate body having a picking portion, picking means in the said portion and comprising a longitudinally extending series of circumferentially pointed barbs and each with a front face in a substantially radial plane extending longitudinally of the picking portion, there being a recessed lead face extending ahead of the barbs to the periphery of the picking portion, and a substantially elongate tip portion forming a continuation of the picking portion and having a longitudinally extending front face forming a continuation of said first mentioned front faces, the tip portion having a uniform convex surface between said continuing front face and the outer periphery of the tip portion.

5. A cotton picking spindle of the character described, including, an elongate body having a picking portion, picking means in the said portion and comprising a longitudinally extending series of circumferentially pointed barbs and each with a front face in a substantially radial plane extending longitudinally of the picking portion, there being a recessed lead face extending ahead of the barbs to the periphery of the picking portion, and a substantially elongate tip portion forming a continuation of the picking portion and having a longitudinally extending front face forming a continuation of said first mentioned front faces, the tip portion between the series of barbs and terminal end of the spindle having a convexly curved surface between said continuing front face and the outer periphery of the tip portion.

6. A cotton picking spindle of the character described, including, an elongate body having a picking portion, picking means in the said portion and comprising a longitudinally extending series of circumferentially pointed barbs, said picking portion having a longitudinally extending recessed lead face extending ahead of the series of barbs and curved radially outward to the periphery of the cone-shaped picking portion, said outwardly curved face being spaced radially inward of the points of the barbs.

7. A cotton picking spindle of the character described, including, an elongate body having a picking portion, picking means in the said portion and comprising a longitudinally extending series of circumferentially pointed barbs, said picking portion having a longitudinally extending recessed lead face extending ahead of the barbs, and said picking portion having a doffing face spaced radially inward of the points of the barbs and extending rearwardly of the barbs.

8. A cotton picking spindle of the character described, including, an elongate body having a picking portion, picking means in the said portion and comprising a longitudinally extending series of circumferentially pointed barbs, said picking portion having a longitudinally extending recessed lead face extending ahead of the barbs, and said picking portion having a doffing face of substantially uniform circumferential radius and spaced radially inward of the points of the barbs and extending rearwardly of the barbs.

9. A cotton picking spindle of the character described, including, an elongate body having a picking portion, picking means in the said portion and comprising a longitudinally extending series of circumferentially pointed barbs, said picking portion having a longitudinally extending recessed lead face extending ahead of the barbs, and said picking portion having a doffing face spaced radially inward of the points of the barbs and extending rearwardly of the barbs, said lead face being curved outwardly to merge with the doffing face.

10. A cotton picking spindle of the character described, including, an elongate body having a picking portion, picking means in the said portion and comprising circumferentially spaced longitudinally extending series of circumferentially pointed barbs, said picking portion having a longitudinally extending recessed lead face extending ahead of each row of the barbs, and said picking portion having a doffing face extending rearwardly of and spaced radially inward of each series of barbs and merging with the recessed lead face of the next succeeding series of barbs.

References Cited in the file of this patent
UNITED STATES PATENTS

| | | |
|---|---|---|
| 2,787,109 | Lindsay | Apr. 2, 1957 |
| 2,823,509 | Lindsay | Feb. 18, 1958 |